(12) United States Patent
Serlie et al.

(10) Patent No.: US 10,540,745 B2
(45) Date of Patent: *Jan. 21, 2020

(54) ZOOMING OF MEDICAL IMAGES

(71) Applicant: KONINKLIJKE PHILIPS N.V., Eindhoven (NL)

(72) Inventors: Iwo Willem Oscar Serlie, Best (NL); Rudolph Martherus, Vlissingen (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,823

(22) Filed: Nov. 3, 2017

(65) Prior Publication Data
US 2018/0075579 A1     Mar. 15, 2018

Related U.S. Application Data

(63) Continuation of application No. 14/128,235, filed as application No. PCT/IB2012/053269 on Jun. 28, 2012, now Pat. No. 10,127,630.

(30) Foreign Application Priority Data

Jun. 29, 2011  (EP) .................................. 11171848

(51) Int. Cl.
*G06T 3/40* (2006.01)
*G06T 3/00* (2006.01)

(52) U.S. Cl.
CPC .............. *G06T 3/40* (2013.01); *G06T 3/0006* (2013.01)

(58) Field of Classification Search
None
See application file for complete search history.

(56) References Cited

U.S. PATENT DOCUMENTS 6,630,937 B2   10/2003  Kallergi et al.
6,748,044 B2    6/2004  Sabol et al.
(Continued)

FOREIGN PATENT DOCUMENTS

FR    26399740 A1    6/1990
JP    2011024622 A    2/2011
(Continued)

OTHER PUBLICATIONS

Qiu "A zoom magnification adjustment system for display area and display content and its method", CN 102023783 English machine translation. Feb. 20, 2011 (Year: 2011).*

(Continued)

*Primary Examiner* — Yanna Wu (57) ABSTRACT

The invention relates to a system for zooming an image displayed in a viewport, wherein the image comprises a plurality of regions, each region of the plurality of regions having a zoom function associated with the region, the system comprising an input unit for receiving a region input for selecting a region of the plurality of regions and for receiving a zoom input for zooming the image, and a zoom unit for zooming the image based on the zoom input, using the zoom function associated with the selected region. The zoom function associated with each region of the plurality of regions may be defined in any way deemed useful. For example, it may be defined in such a way that the selected region or an interesting portion of it is displayed in the viewport or, vice versa, the selected region or an interesting portion thereof is removed from the displayed view of the image. Advantageously, the user does not always need to precisely select the zoom center, as the application will select the zoom center, based at least on the selected region.

18 Claims, 7 Drawing Sheets

(56) References Cited

U.S. PATENT DOCUMENTS

| | | |
|---|---|---|
| 7,127,684 B2 | 10/2006 | Morita et al. |
| 7,715,653 B2 | 5/2010 | Alvarez |
| 8,585,991 B2 | 11/2013 | Dreisinger et al. |
| 8,933,092 B2 | 1/2015 | Holiday |
| 2004/0100477 A1 | 5/2004 | Morita |
| 2004/0169760 A1* | 9/2004 | Furukawa ......... H04N 5/23293 348/333.12 |
| 2010/0007790 A1* | 1/2010 | Kondo ................. G08C 17/02 348/564 |
| 2010/0299627 A1* | 11/2010 | Kenagy ................. G06T 3/40 715/800 |
| 2010/0328351 A1 | 12/2010 | Tan |
| 2013/0235086 A1* | 9/2013 | Otake ............... H04N 5/23293 345/660 |
| 2014/0225929 A1 | 8/2014 | Serlie et al. |

FOREIGN PATENT DOCUMENTS

| | | |
|---|---|---|
| JP | 2012165680 A | 8/2012 |
| TN | 102023783 A | 4/2011 |
| WO | 2006018816 A2 | 2/2006 |

OTHER PUBLICATIONS

Ertas, G. et al., "An Interactive Dynamic Analysis and Decision Support Software for MR Mammography", Computerized Medical Imaging and Graphics, Sciencedirect, vol. 32, No. 4, Jun. 2008.

Keahy, T. Alan, "Visualization for High Dimensional Custers using NonLinear Magnification", Los Alamos National Laboratory, 2000.

Lamar, Eric et al., "A Magnification Lens for Interactive Volume Visualization", Proceedings of Pacific Graphics, 2000, pp. 223-233.

* cited by examiner

ZOOMING OF MEDICAL IMAGES

CROSS-REFERENCE TO RELATED APPLICATIONS

This application is a continuation of U.S. application Ser. No. 14/128,235, filed on Feb. 7, 2014, which is the U.S. National Phase application under 35 U.S.C. § 371 of International Application No. PCT/IB2012/053269, filed on Jun. 28, 2012, which claims the benefit of European Patent Application No. 11171848.2, filed on Jun. 29, 2011. These applications are hereby incorporated by reference herein.

FIELD OF THE INVENTION

The invention relates to displaying medical images. Especially, it relates to interactive zooming of images such as mammography images.

BACKGROUND OF THE INVENTION

Currently, zooming of images is implemented by providing an input for changing the scale of the viewed area. Various implementations are possible. For example, in a 2D image, the user may select the zoom center (i.e., a fixed point in the 2D image) and scroll the mouse wheel to magnify or reduce the image. For mammography, this is typically combined by the display of mirrored images and mirrored pan and zoom operations as described in WO 2006/018816 entitled "Display system for the evaluation of mammographies". Two-dimensional (2D) image zooming can be generalized to three-dimensional (3D) image zooming. For example, for perspective projection, the displayed images are zoomed when the camera moves along the line towards one of the vanishing points. For orthogonal projections, zooming is based on changing the scale in the planes perpendicular to the projection lines, i.e., perpendicular to the viewing direction.

The drawback of available zoom implementations is that, when a user views an image region which is of interest to him, the zooming function does not always keep that region in the display. The region may quickly disappear from the display when the zoom center is fixed far away from the region of interest and the region of interest is close to the border of a viewport for displaying the image. This problem is often addressed by selecting the zoom center in the center of the region of interest. However, this method fails when the region of interest is adjacent to the border of the viewport.

SUMMARY OF THE INVENTION

It would be advantageous to have an improved system for zooming images, wherein an image region of interest can be seen in the viewport while the image is zoomed-in.

To achieve this, in an aspect, the invention provides a system for zooming an image displayed in a viewport, wherein the image comprises a plurality of regions, each region of the plurality of regions having a zoom function associated with the region, the system comprising:
  an input unit for receiving a region input for selecting a region of the plurality of regions and for receiving a zoom input for zooming the image; and
  a zoom unit for zooming the image based on the zoom input, using the zoom function associated with the selected region.

The zoom function associated with a first region of the plurality of regions, said first region surrounding the viewport center, may be defined, for example, in such a way that the center of the first region is the zoom center of a first zoom function associated with the first region. The zoom center of a second zoom function associated with a second region adjacent to the viewport border may be a point on the viewport border adjacent to the second region.

A person skilled in the art will understand how to interpret the zoom center for 2-dimensional and 3-dimensional images. For example, in the case of 2-D images, the zoom center is a point in the image; in the case of orthogonal projection images, the zoom center is a point in the projection plane (viewing plane); for perspective images, the zoom center is the vanishing point.

In an embodiment of the system, the selected region is defined on the basis of a viewport location comprised in the region input. Each region of the plurality of regions may be defined as a portion of the viewport. The viewport location means a location in the viewport. This location may be defined by a point or a pixel, for example. The selected region may be the region of the plurality of regions which comprises the viewport location comprised in the region input.

In an embodiment of the system, the selected region is further defined based on an image object displayed in the viewport and the spatial relation between the viewport location and the object. This allows defining the selected region on the basis of the viewport as well as on the basis of the image contents. For example, a borderline of the region may be defined by a contour for delineating the object.

In an embodiment, the system further comprises a segmentation unit for defining the image object. The segmentation may be carried out automatically, semi-automatically or manually.

In an embodiment of the system, the zoom center of the zoom function associated with a region of the plurality of regions is at a predefined location within the region. For example, the zoom center may be the 'mass' center or 'inertia' center of the region. This helps to keep the portion of the displayed image comprising the center and its surroundings in the viewport. The skilled person will understand how to compute the mass or inertia center of a region replacing mass by image intensity.

In an embodiment of the system, the zoom function associated with the region is a combination of a zoom, pan and/or rotation transformation. For example, the zoom center may be translated while the image is rescaled. Optionally, the displayed image may be rotated about the zoom center. In this way, interesting image features may be better represented in the zoomed image.

In an embodiment, the system is further arranged for zooming a second image displayed in a second viewport, wherein
  each region of the plurality of regions has a second zoom function associated with the region for zooming the second image, and
  the zoom unit is further arranged for zooming the second image based on the zoom input, using the second zoom function associated with the selected region.

This is useful, for example, in mammography, where mirrored images of the right and left breast are displayed, each in its own viewport, and zoomed simultaneously based on a zoom input provided for the right or left breast. The viewports may be combined into a single display area.

In an embodiment of the system, the second zoom function is based on the zoom function associated with the selected region in the image and a map of the viewport into the second viewport, wherein the zoom center of the second zoom function associated with the selected region is obtained by mapping the zoom center of the zoom function associated with the selected region into the second viewport using said mapping. The second zoom scale of the second zoom function is computed based on the zoom scale of the zoom function. For example, the two scales may be identical.

Advantageously, the system of the invention may be used for digital mammography.

In a further aspect, the invention provides an image acquisition apparatus comprising an embodiment of the disclosed system.

In a further aspect, the invention provides a workstation comprising an embodiment of the disclosed system.

In a further aspect, the invention provides a method of zooming an image displayed in a viewport, wherein the image comprises a plurality of regions, each region of the plurality of regions having a zoom function associated with the region, the method comprising:
- an input step for receiving a region input for selecting a region of the plurality of regions and for receiving a zoom input for zooming the image; and
- a zoom step for zooming the image based on the zoom input, using the zoom function associated with the selected region.

In a further aspect, the invention provides a computer program product to be loaded by a computer arrangement, comprising instructions for zooming an image displayed in a viewport, wherein the image comprises a plurality of regions, each region of the plurality of regions having a zoom function associated with the region, the computer program product, after being loaded, providing said processing unit with the capability to carry out steps of an embodiment of the disclosed method.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system or of the method, can be carried out by a person skilled in the art on the basis of the description.

A person skilled in the art will appreciate that an image dataset in the claimed invention may be a 2-dimensional (2-D), 3-dimensional (3-D) or 4-dimensional (4-D) image dataset, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is disclosed in the independent claims. Advantageous embodiments are disclosed in the dependent claims.

BRIEF DESCRIPTION OF THE DRAWINGS

These and other aspects of the invention will become apparent from and will be elucidated by means of the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
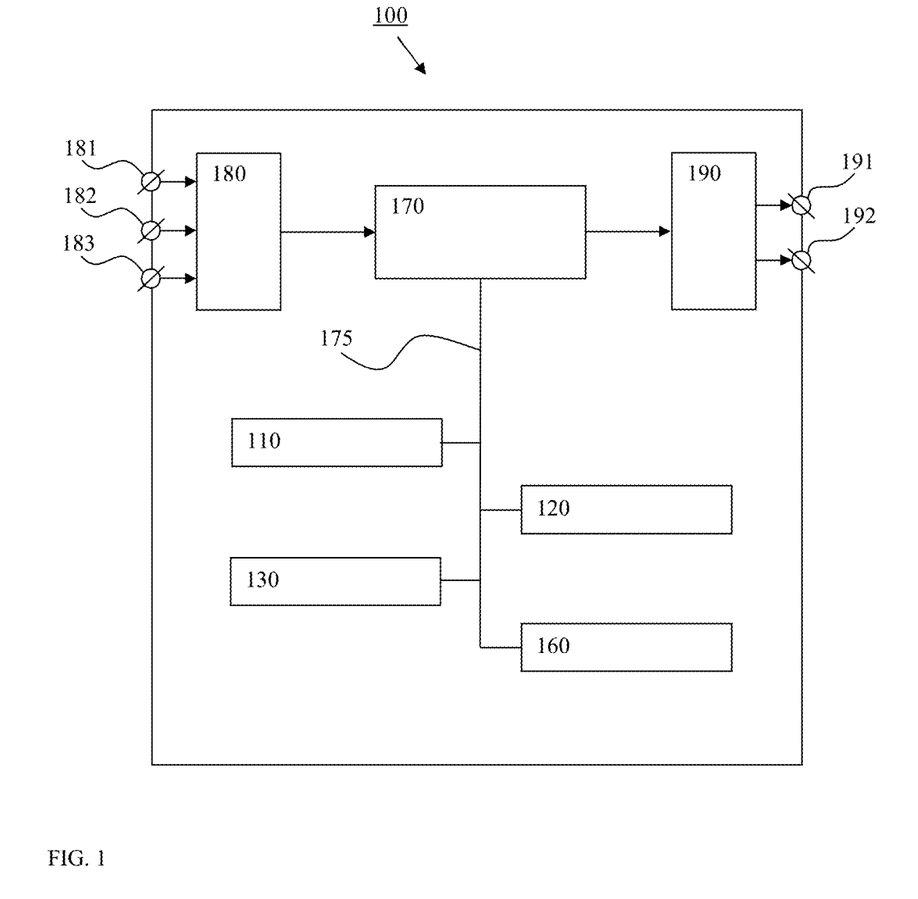
FIG. 1 shows a block diagram of an exemplary embodiment of the system.

FIG. 1 schematically shows a block diagram of an exemplary embodiment of the system 100 for zooming an image displayed in a viewport, wherein the image comprises a plurality of regions, each region of the plurality of regions having a zoom function associated with the region, the system comprising:
- an input unit 110 for receiving a region input for selecting a region of the plurality of regions and for receiving a zoom input for zooming the image; and
- a zoom unit 120 for zooming the image based on the zoom input, using the zoom function associated with the selected region.

The exemplary embodiment of the system 100 further comprises:
- a segmentation unit 130 for defining the image object;
- a control unit 160 for controlling the work of the system 100; and
- a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data comprises the image data, the region input and the zoom input. Optionally, the input data may comprise instructions for the segmentation unit 130. The memory unit 170 may be implemented by devices such as, but not limited to, a register file of a CPU, a cache memory, a Random Access Memory (RAM) chip, a Read Only Memory (ROM) chip, and/or a hard disk drive and a hard disk. The memory unit 170 may be further arranged to store the output data. The output data comprises the zoomed image data. The memory unit 170 may be also arranged to receive data from and/or deliver data to the units of the system 100 comprising the input unit 110, the zoom unit 120, the segmentation unit 130, and the control unit 160, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

In an embodiment of the system 100, the system 100 comprises a control unit 160 for controlling the system 100. The control unit 160 may be arranged to receive control data from and provide control data to the units of the system 100. For example, after receiving a region input for selecting a region of the plurality of regions and a zoom input for zooming the image, the input unit 110 may be arranged to provide control data "the input data has been received" to the control unit 160, and the control unit 160 may be arranged to provide control data "zoom the image" to the zoom unit 120. Alternatively, a control function may be implemented in another unit of the system 100.

Figure 2:
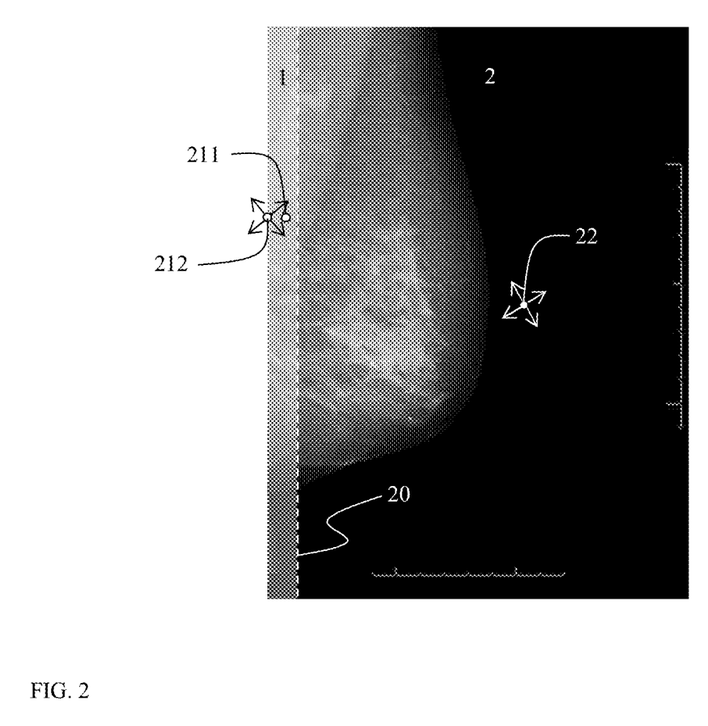
FIG. 2 shows regions of an image, defined on the basis of a partition of the viewport.

In an embodiment, the invention is used by a physician for viewing an image of the left breast. FIG. 2 shows the left breast image in a viewport. There are two image regions, first image region 1 and second image region 2, defined on the basis of a partition of the viewport by a partition line 20. Such definition of regions is useful in the case of x-ray mammography, where the breast image is shown in the viewport in a standardized way. The first region 1 is located near the chest wall. The second region 2 comprises the remaining part of the image, not included in the first region 1. The user may use the mouse to provide the region input and the zoom input. In an embodiment, the user may move the pointer to point at a location in the image and click the mouse button, thereby selecting a viewport location. Further, the user may use the mouse wheel to zoom in or out the image. If the selected location 211 is included in the first region 1, the first region 1 is selected and the zoom function is the function associated with the first region 1. The zoom center of the zoom function associated with the first region 1 is at the location 212, which is the intersection of the horizontal crossing the selected location 211 and the left viewport border line. In this way, the user can view an area of the breast tissue near the chest wall. If the user selects a location 22 in the second region 2, the second region 2 is selected and the zoom function is the function associated with the second region 2. The selected location 22 becomes the zoom origin of the zoom function associated with the second region 2.

Figure 3:
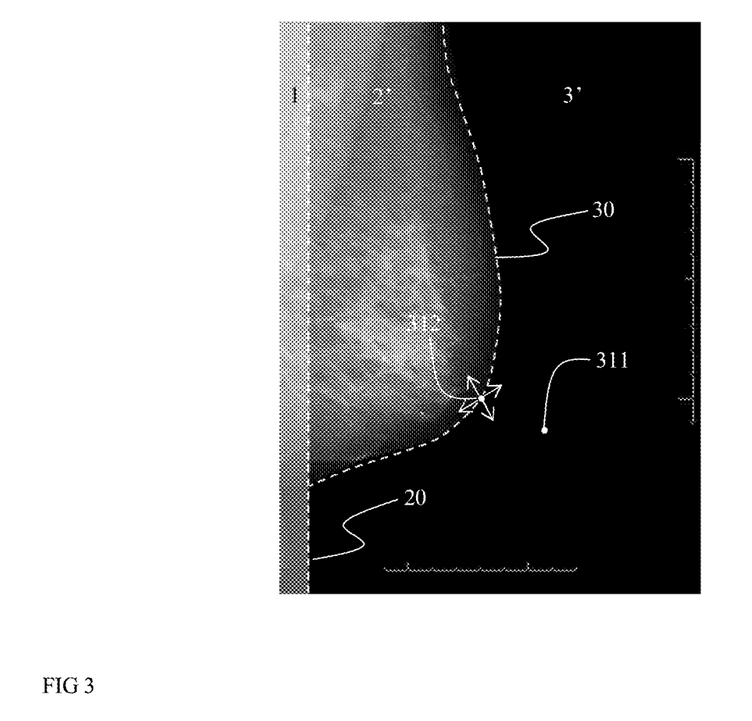
FIG. 3 shows regions of an image, defined on the basis of object delineation.

In an embodiment of the system, the selected region is further defined based on an image object displayed in the viewport and the spatial relation between the viewport location and the object. This embodiment is illustrated in FIG. 3. There are three image regions 1, 2' and 3', defined on the basis of a partition of the viewport by a partition line 20 and a partition curve 30. Such a definition of the regions is useful in the case of x-ray mammography, where the breast image is shown in the viewport in a standardized way. The partition curve 30 may be defined relative to the viewport. Alternatively, the partition curve may be defined based on image segmentation by the breast skin shown in the image displayed in the viewport. The segmentation can be performed manually, semi-automatically or automatically. A person skilled in the art will be able to choose and implement a suitable segmentation method.

As in the previous embodiment illustrated in FIG. 2, the user may use the mouse to provide the region input and the zoom input by, in succession, moving the mouse pointer to point at a location in the image, clicking the mouse button, thereby selecting the location, and further using the mouse wheel to zoom in or out the image. The zoom functions associated with regions 1 and 2' are the same as described above for regions 1 and 2 in FIG. 2, respectively. A third zoom function is associated with region 3'. If the selected location 311 is in the third region 3', the third region 3' is selected and the zoom function is the function associated with region 3', the zoom center of this zoom function is at the location 312, which is a location defined by the intersection of the normal to the partition curve 30 crossing the selected location 311 and the partition curve. Thus, selecting a location in the third region 3', the user can zoom in an area of the breast near the selected portion of the skin.

Optionally, the zoom center may be visualized by a marker as illustrated in FIGS. 2 and 3.

Figure 4:
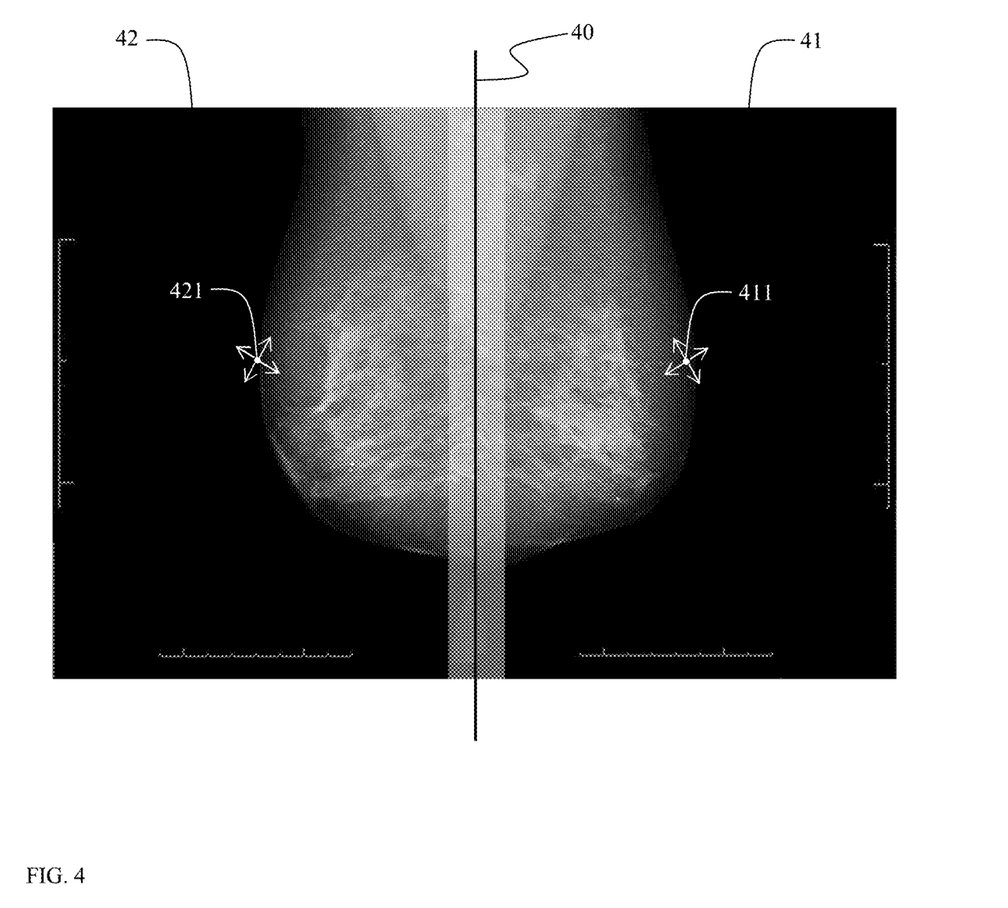
FIG. 4 illustrates an embodiment of the system for concurrently zooming mirrored images of the right and the left breast.

In an embodiment, the system 100 is further arranged for zooming a second image displayed in a second viewport, wherein each region of the plurality of regions has a second zoom function associated with the region for zooming the second image, and the zoom unit 120 is further arranged for zooming the second image based on the zoom input, using the second zoom function associated with the selected region. This is useful, for example, in mammography, where mirrored images of the right and left breast are displayed, each in its own viewport, and zoomed simultaneously based on a zoom input provided on the basis of the right or left breast. FIG. 4 shows the right breast image in the viewport 41 and the left breast image in the second viewport 42. The viewports are combined into a single display area. By providing a region input and a zoom input for zooming the image, the second image is zoomed concurrently with the image, using derived zooming parameters based on the same inputs and the associated second zoom function.

In an embodiment of the system 100, the second zoom function is based on the zoom function associated with the selected region in the image and a map of the viewport into the second viewport for mapping the zoom center of the zoom function associated with the selected region into the zoom center associated with the second zoom function. This embodiment is illustrated also in FIG. 4, wherein the map is the mirror reflection of the viewport 41 over the 'symmetry' line 40 into the second viewport 42. The second zoom function is thus defined by the zoom center 421 which is the mirror image of the zoom center 411.

Although the embodiments of the invention have been described with reference to x-ray mammography images, a person skilled in the art will understand that the invention is useful for interacting with other images. Examples of such images include, but are not limited to, MRI brain scans and PET images of the lungs.

Those skilled in the art will further understand that other embodiments of the system 100 are also possible. It is possible, among other things, to redefine the units of the system and to redistribute their functions. For example, there may be several segmentation units 130, each implementing a different segmentation technique. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 5:
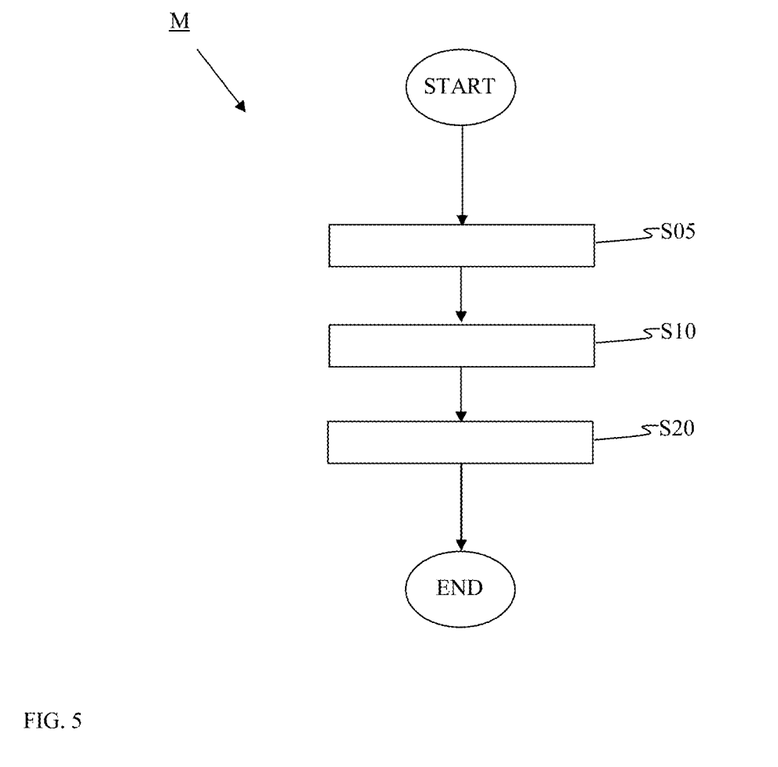
FIG. 5 shows a flowchart of exemplary implementations of the method.

An exemplary flowchart of the method M of zooming an image displayed in a viewport, wherein the image comprises a plurality of regions, each region of the plurality of regions having a zoom function associated with the region, is schematically shown in FIG. 5. The method M begins with an optional segmentation step S05 for defining an object in the image. Alternatively, or after the segmentation step S05, the method M is arranged for performing an input step S10 for receiving a region input for selecting a region of the plurality of regions and for receiving a zoom input for zooming the image. After the input step S10, the method M continues to a zoom step S20 for zooming the image based on the zoom input, using the zoom function associated with the selected region. After the zooming S20 step, the method M terminates.

Figure 6:
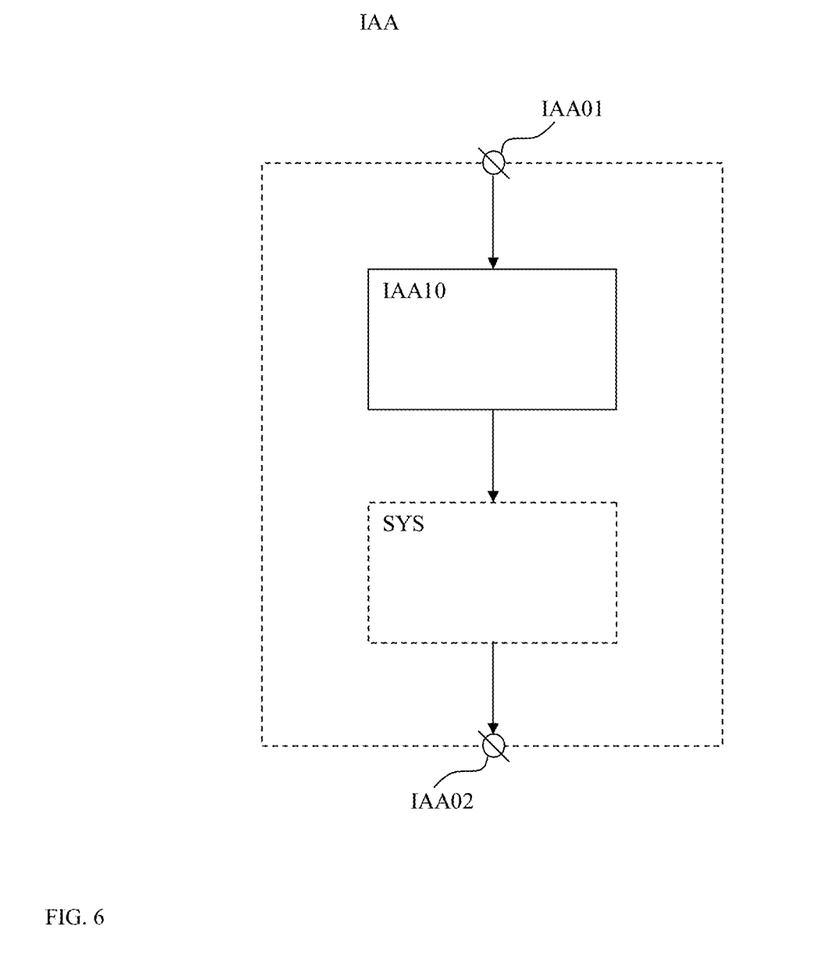
FIG. 6 schematically shows an exemplary embodiment of the image acquisition apparatus.

FIG. 6 schematically shows an exemplary embodiment of the image acquisition apparatus IAA employing the system SYS of the invention, said image acquisition apparatus IAA comprising an image acquisition unit IAA10 connected via an internal connection with the system SYS, an input connector IAA01, and an output connector IAA02. This arrangement advantageously increases the capabilities of the image acquisition apparatus IAA, providing said image acquisition apparatus IAA with advantageous capabilities of the system SYS.

Figure 7:
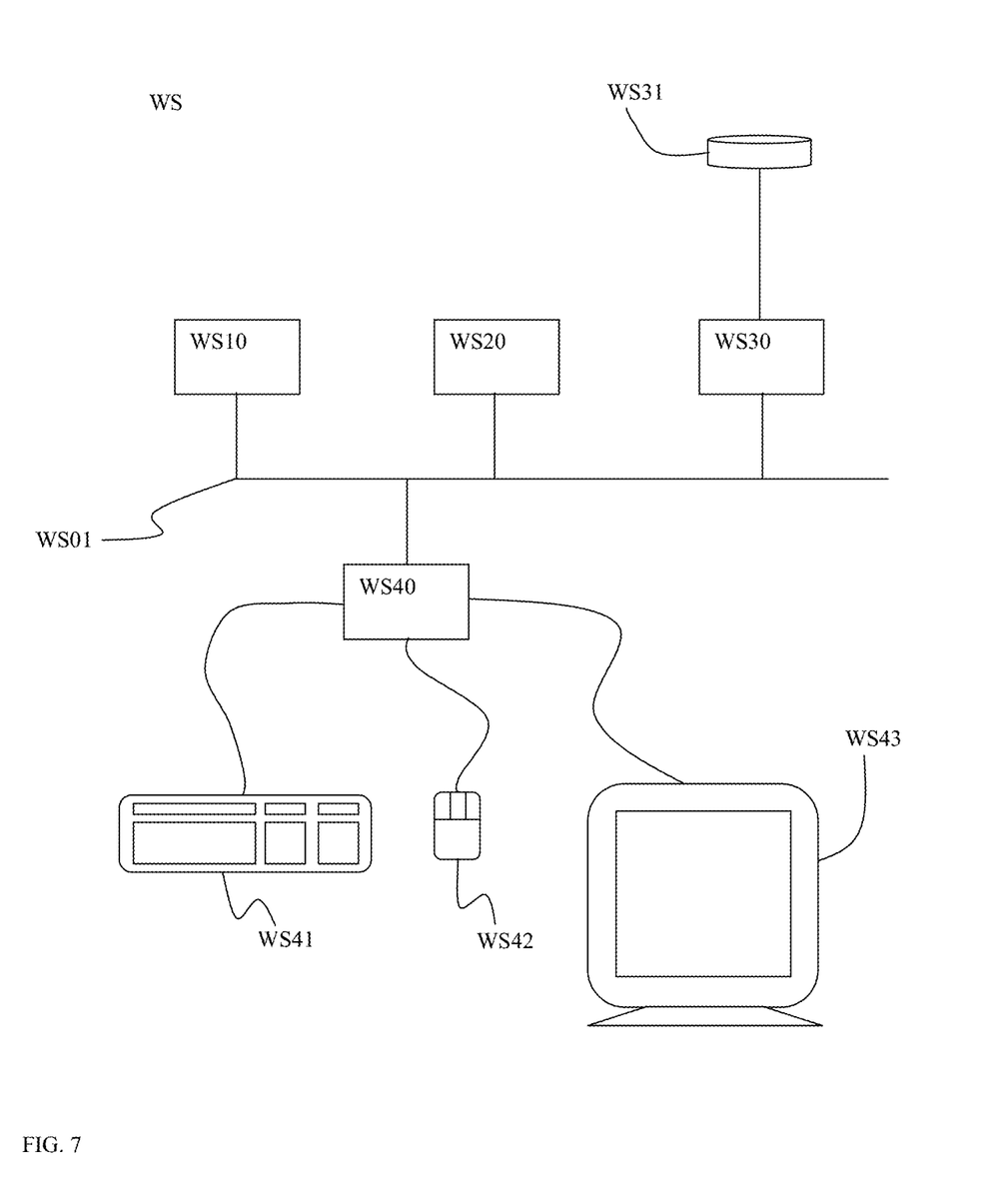
FIG. 7 schematically shows an exemplary embodiment of the workstation.

FIG. 7 schematically shows an exemplary embodiment of the workstation WS. The workstation comprises a system bus WS01. A processor WS10, a memory WS20, a disk input/output (I/O) adapter WS30, and a user interface WS40 are operatively connected to the system bus WS01. A disk storage device WS31 is operatively coupled to the disk I/O adapter WS30. A keyboard WS41, a mouse WS42, and a display WS43 are operatively coupled to the user interface WS40. The system SYS of the invention, implemented as a computer program, is stored in the disk storage device WS31. The workstation WS is arranged to load the program and input data into memory WS20 and execute the program on the processor WS10. The user can input information to the workstation WS, using the keyboard WS41 and/or the mouse WS42. The workstation is arranged to output information to the display device WS43 and/or to the disk WS31. A person skilled in the art will understand that there are numerous other embodiments of the workstation WS known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same record of hardware or software. The usage of the words first, second, third, etc., does not indicate any ordering. These words are to be interpreted as names.

The invention claimed is:

1. A device comprising:
    a display that displays an image comprising a plurality of regions partitioning the image, wherein each of the plurality of regions comprise a zoom function associated with the region;
    an input circuit that receives a location of a pointing indicator on the display;
    wherein the location of the pointing indicator identifies a region selection and a zoom function associated with the region selection; and
    a control circuit that modifies the image based on the region selection and the associated zoom function;
    wherein the zoom function of each region of the plurality of regions determines a zoom center of the region about which the image is zoomed;
    wherein the zoom function of each region of the plurality of regions defines a relationship between the location of the pointing indicator on the display and the zoom center of the region; and
    wherein the relationship between the location of the pointing indicator on the display and the zoom center of at least one region differs from the relationship between the location of the pointing indicator on the display and the zoom center of another region.

2. The device according to claim 1, wherein the zoom center of the zoom function associated with at least one of the plurality of regions is a center of the at least one of the plurality of regions.

3. The device according to claim 1, wherein the zoom center of the zoom function associated with at least one of the plurality of regions is a point on a border of the at least one of the plurality of regions.

4. The device according to claim 1, wherein at least one of the plurality of regions is defined by image content.

5. The device according to claim 4, wherein the image content is automatically detected.

6. The device according to claim 1, wherein at least one of the plurality of regions is defined by the display.

7. The device according to claim 1, wherein the display comprises at least two display interfaces.

8. The device according to claim 7, wherein the at least two display interfaces are combined into a single display area.

9. The device according to claim 7, wherein the region selection and the zoom function associated with the region selection are associated with a first display interface, and wherein the region selection and the zoom function associated with the region selection modify an image associated with a second display interface.

10. A method comprising:
displaying, on a display device, an image comprising a plurality of regions partitioning the image, wherein each of the plurality of regions comprise a zoom function associated with the region; and
receiving, via an input circuit, a location of a pointing indicator on the display device; wherein the pointing indicator on the display device identifies a region selection and a zoom function associated with the region selection,
wherein the image is modified based on the region selection and the associated zoom function;
wherein the zoom function of each region of the plurality of regions determines a zoom center of the region about which the image is zoomed;
wherein the zoom function of each region of the plurality of regions defines a relationship between the location of the pointing indicator on the display device and the zoom center of the region; and
wherein the relationship between the location of the pointing indicator on the display device and the zoom center of at least one region differs from the relationship between the location of the pointing indicator on the display device and the zoom center of another region.

11. The method according to claim 10, wherein the zoom center of the zoom function associated with at least one of the plurality of regions is a center of the at least one of the plurality of regions.

12. The method according to claim 10, wherein the zoom center of the zoom function associated with at least one of the plurality of regions is a point on a border of the at least one of the plurality of regions.

13. The method according to claim 10, wherein at least one of the plurality of regions is defined by image content.

14. The method according to claim 13, wherein the image content is automatically detected.

15. The method according to claim 10, wherein at least one of the plurality of regions is defined by the display device.

16. The method according to claim 10, wherein the display device comprises at least two display interfaces.

17. The method according to claim 16, wherein the at least two display interfaces are combined into a single display area.

18. The method according to claim 16, wherein the region selection and the zoom function associated with the region selection are associated with a first display interface, and wherein the region selection and the zoom function associated with the region selection modify an image associated with a second display interface.

* * * * *